United States Patent Office 3,244,407
Patented Apr. 5, 1966

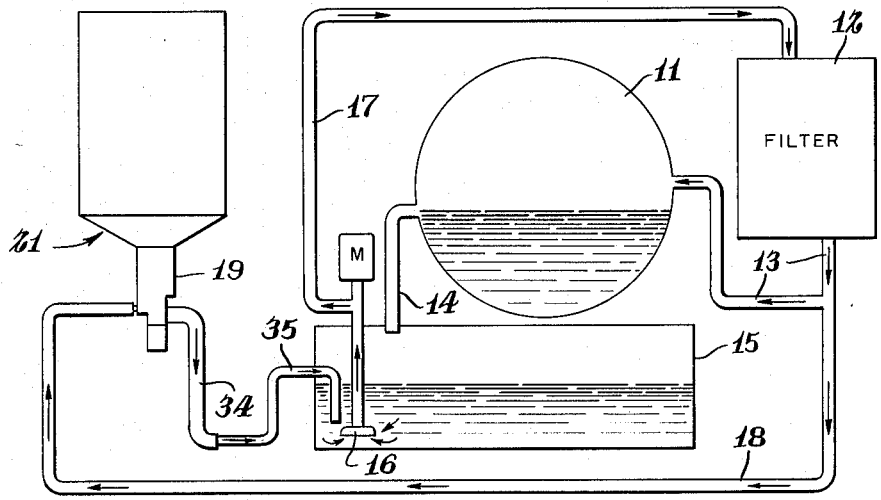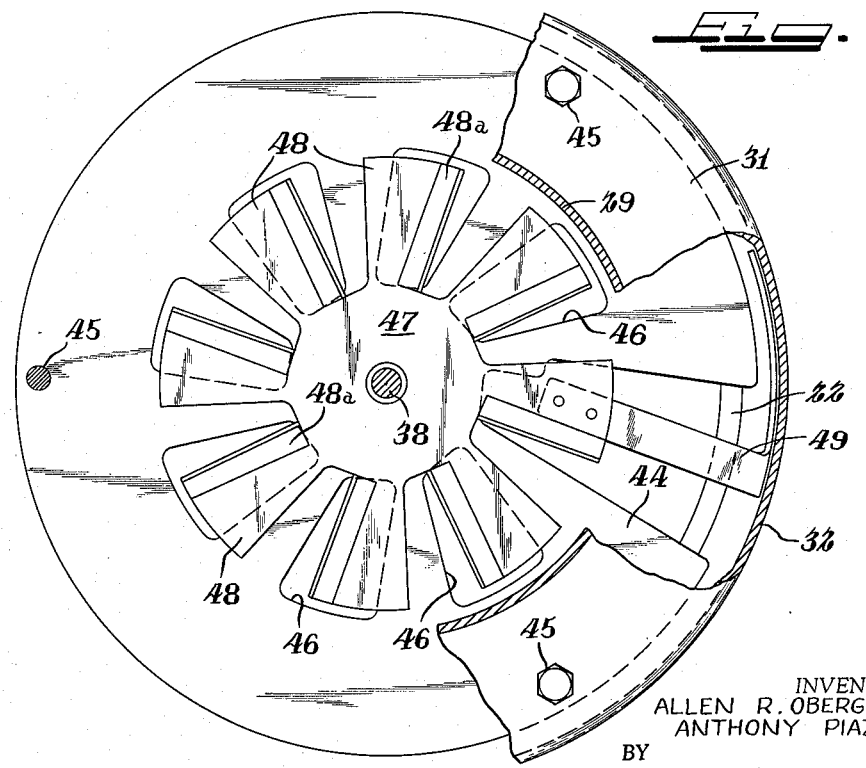

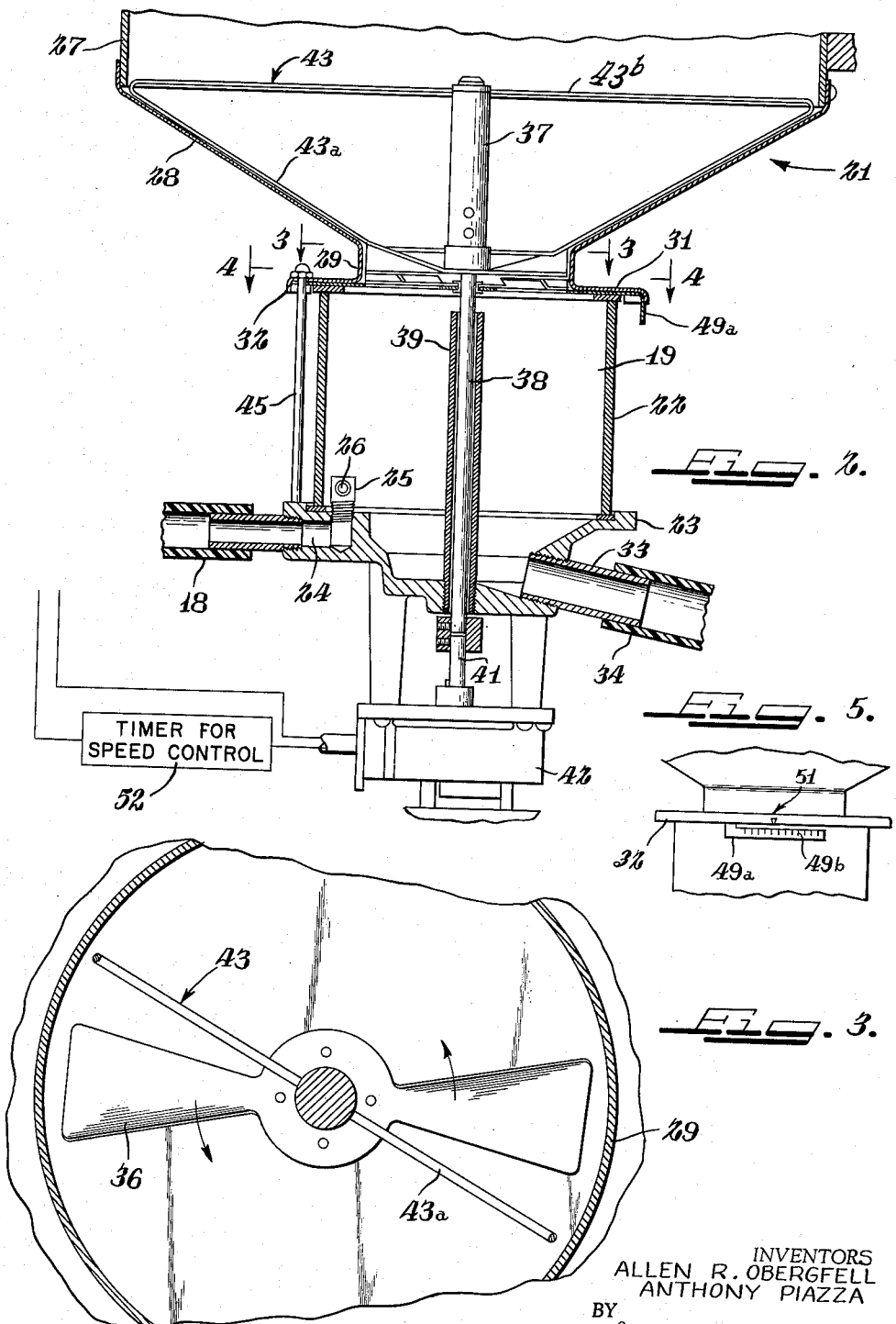

3,244,407
APPARATUS FOR FEEDING AND MIXING POWDERED FILTER AID
Allen R. Obergfell, Niles, and Anthony Piazza, Chicago, Ill., assignors to Piazza Engineering Corporation, Chicago, Ill., a corporation of Illinois
Filed Jan. 9, 1964, Ser. No. 336,831
7 Claims. (Cl. 259—4)

This invention relates to improvements in dry cleaning apparatus and is more particularly concerned with the novel construction and assembly of the flow system for mixing a filter aid slurry with the cleaning solvent and for controlling the quantity of slurry delivered to said system.

During operation of dry cleaning apparatus, a cleaning solvent is flowed continuously from a reservoir or storage tank to a filter and then to the cleaning apparatus which returns dirty solvent to the storage tank. Heretofore, a suitable filter aid effective to assist in the removal of dirt and other foreign particles from the solvent has been delivered manually into the washer or other opening prior to the pump position for mixinng with the solvent flowing therethrough. However, the mixture tends to run off quickly during initial operation of the cleaning apparatus thus reducing the effectiveness of the filter during subsequent use.

The present invention is concerned with a novel system of solvent flow wherein controlled quantities of slurry consisting of a mixture of solvent and powdered filter aid is delivered directly into the storage tank at a point closely adjacent to the input port of the filter pump. The filter aid may consist of any carbon, sweetening powders that have an affinity with acid and dye and diatomaceous earth, alone or in combination.

In practice it has been found that it is necessary to deliver slurry to the filter during but the first six to eight minutes of cleaning machine operation, during which time the greater percentage of dirt and other foreign particles are removed from the articles being cleaned. In use of the system of the present disclosure, the feeding of slurry during this period preferably is approximately proportioned to the amount of dirt present and accordingly the amount fed progressively diminishes as the amount of dirt in the solvent is reduced. In order to accomplish this controlled, gradually diminished, addition of slurry to the solvent, applicant has provided a novelly constructed power driven feed apparatus used in association with a timer and variable speed control device operable to gradually reduce the amount of filter aid delivered to the solvent.

It is therefore an object of the invention to provide novel means for delivering filter aid to the solvent used in dry cleaning apparatus.

Another object is to provide a novelly constructed apparatus for mixing the filter aid with a solvent.

Another object is to provide, in a slurry mixer, a novelly constructed valve assembly for controlling the amount of powdered filter aid delivered to the fluid flowing therethrough.

Another object is to provide a novel slurry mixer which is not expensive to manufacture, is simple to construct and assemble, and is very efficient and accurate in its operation.

The structure by means of which the above noted and other objects and advantages of the invention are attained will be described in the following specification, taken in conjunction with the accompanying drawings, showing preferred illustrative embodiments of the invention, in which:

FIG. 1 is a schematic illustration of a cleaning apparatus solvent flow system embodying the features of the present invention.

FIG. 2 is an enlarged fragmentary vertical sectional view of the powder feeder and slurry mixer.

FIG. 3 is a detail sectional view, on an enlarged scale, taken on line 3—3 of FIG. 2, and omitting the metering plates.

FIG. 4 is an enlarged detail sectional view taken on line 4—4 of FIG. 2, showing the housing broken away.

FIG. 5 is a fragmentary elevational view of the mixer showing the metering plate position indicator.

Referring to the accompanying drawings, and particularly to the FIG. 1 disclosure, the exemplary system disclosed includes a dry cleaning apparatus 11 and embodies a filter 12 from the clean side of which a conduit 13 conveys clean solvent to said apparatus 11. Dirty solvent leaves cleaning apparatus 11 through a conduit 14 which delivers it into a storage tank 15 which contains a supply of solvent. A suction pump 16 in said tank delivers the solvent from the tank through a conduit 17 back to filter 12.

Efficient cleaning of the dirty solvent delivered to the filter by means of pump 16 is dependent upon the admixture with said solvent of a powdered filter aid which, in the present disclosure, is preliminarily mixed with a quantity of the clean solvent leaving the filter so as to produce a slurry which then is discharged into the storage tank in close proximity to the suction pump 16. This manner of slurry discharge insures that it is carried into the pump substantially without further dilution or settling in the tank 15.

Referring again to the FIG. 1 disclosure, a bypass line 18, in flow communication with the clean solvent conduit 13, delivers a quantity of clean solvent to a chamber 19 (FIG. 2) constituting a part of a combination powder feeder and slurry mixer 21. As best shown in FIG. 2, the feeder-mixer includes the chamber 19 which is defined in part by a circular wall 22 suitably sealed at its lower end by a member 23 which may be a casting having an inlet passageway 24 to which conduit 18 is connected. The passageway 24 terminates in an upstanding fitting 25 that has a circumferentially directed outlet port 26 therein disposed in a manner to cause fluid discharged therefrom to swirl around within chamber 19.

The feeder-mixed also includes a cylindrical hopper 27 having a downwardly inwardly constricted bottom wall 28 formed on its bottom end with a circular flange 29 that terminates in an external flat wall 31 having a downturned peripheral flange 32. The circular flange 29 and flat wall 31 constitute an enclosure for metering plates and an impeller, to be described in detail presently and which function to feed predetermined amounts of dry powdered filter aid such as diatomaceous earth or other filter powders, contained in hopper 27 into the fluid contained in chamber 19. The resulting slurry is discharged from the chamber through an outlet 33, into a large diameter conduit 34 and thence to conduit 35 having its discharge end located closely adjacent to suction pump 16. In this manner the slurry discharged from conduit 35 is picked up by the pump and conveyed along with dirty solvent back to the filter 12.

As noted hereinabove, the flange 29 and wall 31 house the metering plates and impeller. As best shown in FIGS. 2 and 3, the impeller comprises a two bladed fan-like structure 36 mounted firmly on a hub 37 that extends upwardly into hopper 27. The hub is mounted firmly on a shaft 38 that extends downwardly through a sleeve 39, carried by casting 23, and through said casting for connection with the shaft 41 of a variable speed electric motor 42. Also carried by the hub 37 is an agitator 43 which is fabricated from stiff shape retaining wire stock and shaped to provide radial arm portions 43a that conform to and lie substantially close to the constricted bottom wall 28 and radial portions 43b, definining a tie bar, that are located substantially in horizontal alignment with the bottom edge of cylindrical hopper 27. This agitator functions to break up the powder which tends to cake thus insuring that there is a constant flow of powder to the impeller 36.

The metering plates are arranged beneath impeller 36. As best shown in FIG. 4, the metering plate assembly comprises a disc 44 of sufficient diameter to be secured firmly in place beneath the flat wall 31 as by means of tie bolts 45 that connect the flat wall and casting 23 firmly together with the cylindrical wall 22 between them. The disc 44 has a circumferential series of mutually spaced substantially rectangular openings 46 therein. Arranged immediately above said disc and in surface contact therewith is a movable metering element 47 in the form of a disc having a series of circumerentially spaced radial arms 48 corresponding in number to the number of openings 46 and of sufficient size as to substantially overlie said openings when arranged in register therewith. Each of these arms 48 has one margin 48a turned upwardly at an angle of about 45°, each to define a scoop into which the powder material passing out from beneath the impeller is received. Powder material entering beneath the upturned margins 48a falls through the openings 46 into the swirling mass of solvent in chamber 19. The quantity of powder discharged through openings 46 may be accurately controlled by rotating adjustment of the element 47. This is accomplished by providing on said element an arm 49 that extends outwardly radially, as best shown in FIGS. 4 and 5, and terminates in an arcuate member 49a disposed in close relation to the depending plate flange 32 and which may have indicia markings 49b thereon complemental to an index point 51 on said flange.

It should be evident from the foregoing that the filter powder, which may be any one of many now commercially available, is delivered in measured quantities without degrading to the fluid in chamber 19 and that the resultant slurry is ultimately delivered to the filter 12 in substantially undiluted form owing to the close proximity of its discharge to the suction pump.

Since it has been established that the amount of dirt removed by the cleaning apparatus and entrained in the solvent diminishes as the cleaning operation progresses, the amount of filter powder delivered to the solvent in chamber 19 may be progressivetly decreased as the cleaning operation progresses. This is accomplished by the herein disclosed structure by the provision of the variable speed motor 42 (preferably six speeds) for driving the impeller 36. Such speed control is best accomplished by providing a combination timer and selective switch control 52 in the circuit ot the motor. This control may be of any construction which operates to progressively slow down the motor at successive time intervals during machine operation.

Although we have described a preferred embodiment of our invention, in considerable detail, it will be understood that the description thereof is intended to be illustrative, rather than restrictive, as many details of the structure disclosed may be modified or changed without departing from the spirit or scope of the invention. Accordingly, we do not desire to be restricted to the exact construction described.

We claim:
1. Apparatus for mixing measured amounts of powdered filter aid with a fluid comprising, in combination, a chamber having a fluid inlet and an outlet, a reservoir for powdered filter aid arranged above said chamber, a passageway connecting said reservoir with said chamber, a first plate bridging said passageway, said plate having a plurality of circumferentially spaced apertures therein, a second plate arranged over and in face to face contact with said apertured plate, said second plate having radial arms responding in number to the number of apertures in the first plate, means to rotate the second plate to locate the arms in predetermined relation to the apertures to vary the effective size of said apertures, and an impeller arranged above said plates operable to deliver filter aid to said apertures for discharge therethrough.

2. The apparatus recited in claim 1, in which each arm has an upwardly diverging leading edge adapted to entrap powdered filter aid and deliver it to the apertures.

3. The apparatus recited in claim 1, in which the arm has an upwardly diverging leading edge adapted to prevent degrading of the filter aid.

4. The apparatus recited in claim 1, in which a motor is provided to drive the impeller.

5. The apparatus recited in claim 4, in which the motor is a variable speed electric motor.

6. The apparatus recited in claim 1, in which the fluid inlet is disposed in a circumferential direction to swirl the fluid in the chamber.

7. The apparatus recited in claim 1, in which means is provided to progressively reduce the rate of delivery of filter aid to said chamber.

References Cited by the Examiner

UNITED STATES PATENTS

| | | | |
|---|---|---|---|
| 773,852 | 11/1904 | Cutting | 259—8 |
| 1,545,091 | 7/1925 | Flowers | 68—18 X |
| 1,669,235 | 5/1928 | Fenton | 68—18 X |
| 1,737,090 | 11/1929 | Meyers | 259—178 X |
| 1,760,018 | 5/1930 | Soss | 15—526 |
| 2,359,138 | 9/1944 | Martin | 68—18 |
| 3,100,191 | 8/1963 | Smith et al. | 210—193 X |
| 3,123,256 | 3/1964 | Smith et al. | 222—241 X |

FOREIGN PATENTS 715,522  12/1941  Germany.

WILLIAM I. PRICE, *Primary Examiner.*